US010577081B2

(12) United States Patent
Baca et al.

(10) Patent No.: US 10,577,081 B2
(45) Date of Patent: Mar. 3, 2020

(54) PROACTIVE VEHICLE CONTROL SYSTEMS AND METHODS

(71) Applicant: Intel Corporation, Santa Clara, CA (US)

(72) Inventors: Jim S. Baca, Corrales, NM (US); Alec Iverson, Gilbert, AZ (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 831 days.

(21) Appl. No.: 15/079,940

(22) Filed: Mar. 24, 2016

(65) Prior Publication Data

US 2017/0274985 A1      Sep. 28, 2017

(51) Int. Cl.
| | |
|---|---|
| *B64C 13/16* | (2006.01) |
| *G08G 5/00* | (2006.01) |
| *G06K 9/00* | (2006.01) |
| *G05D 1/02* | (2006.01) |

(52) U.S. Cl.
CPC ........... *B64C 13/16* (2013.01); *G05D 1/0204* (2013.01); *G06K 9/00657* (2013.01); *G08G 5/0013* (2013.01); *G08G 5/0021* (2013.01); *G08G 5/0091* (2013.01)

(58) Field of Classification Search
CPC .... B64C 13/16; G05D 1/0204; G08G 5/0021; G08G 5/0013; G08G 5/0091; G06K 9/0065
See application file for complete search history.

(56) References Cited

U.S. PATENT DOCUMENTS

| | | | | |
|---|---|---|---|---|
| 9,959,771 | B1* | 5/2018 | Carlson | G08G 5/0039 |
| 10,023,323 | B1* | 7/2018 | Roberts | B64D 43/00 |
| 2005/0035242 | A1* | 2/2005 | Nugent | B64C 13/16 244/175 |
| 2005/0045761 | A1* | 3/2005 | Nugent | B64C 13/16 244/3.16 |
| 2014/0336928 | A1 | 11/2014 | Scott | |
| 2015/0210387 | A1 | 7/2015 | Ling | |
| 2015/0268666 | A1 | 9/2015 | Wang et al. | |
| 2016/0076892 | A1 | 3/2016 | Zhou et al. | |

FOREIGN PATENT DOCUMENTS

WO       2015-108586 A2       7/2015

OTHER PUBLICATIONS

International Search Report and Written Opinion issued in PCT Application No. PCT/US2017/014600, dated May 29, 2017, 15 pages.

* cited by examiner

*Primary Examiner* — Michael J Zanelli
(74) *Attorney, Agent, or Firm* — Grossman, Tucker, Perreault & Pfleger, PLLC

(57) ABSTRACT

A vehicle may include a sensor and a proactive vehicle controller that is capable of proactively altering one or more vehicle operating parameters in response to detecting a force caused by an environmental event that will be exerted on a chassis of the vehicle. The sensor has a field-of-view that includes the direction of travel of the vehicle. The sensor may detect objects in the field-of-view and, based at least in part on the behavior of the objects in the field-of-view, predicts the force exerted on the object by an environmental event. Based on the predicted force, the proactive vehicle controller proactively adjusts one or more vehicle operating parameters to minimize the effect of the force that will be exerted on the vehicle by the environmental event.

18 Claims, 4 Drawing Sheets

PROACTIVE VEHICLE CONTROL SYSTEMS AND METHODS

TECHNICAL FIELD

The present disclosure relates to autonomous control systems for vehicles.

BACKGROUND

The rapidly increasing numbers of autonomous and/or remotely operated vehicles, such as aerial drones, places a renewed emphasis on the need to tightly control such vehicles to avoid collisions with objects such as people, buildings, and other stationary objects. Such vehicles are currently in widespread use in commercial applications such as photography, cinematography, and remote delivery of goods. These vehicles are typically battery operated and have a finite charge which limits the cargo carrying capacity of the vehicle. In addition, the vehicles are often constructed of plastic or other lightweight materials to improve range and reduce the load imposed on the power storage device (e.g., battery, supercapacitor, ultracapacitor) simply to return the vehicle to the origination point. Unfortunately, such lightweight construction places the vehicle in a vulnerable state with regard to random, variable, and occasionally damaging atmospheric or environmental conditions such as electrical activity, wind, wind shear, and precipitation. Having the ability to detect such environmental conditions and proactively adjust one or more vehicle operating parameters and/or vehicle routing to improve vehicle operational safety and/or vehicle range is therefore beneficial.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
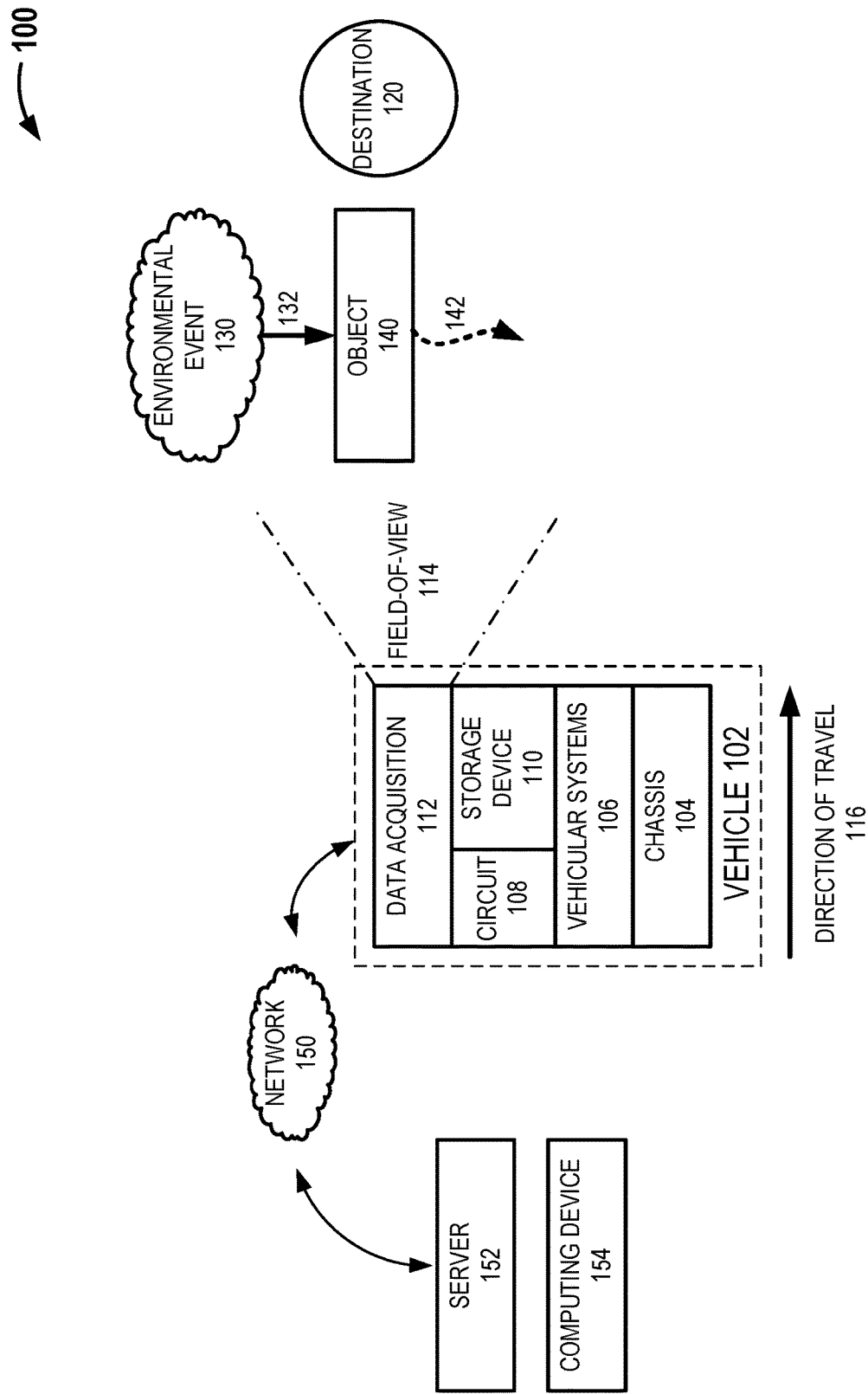
FIG. 1 provides a schematic diagram of an illustrative autonomous proactive vehicular control system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

Many vehicles carry a number of sensors and a number of controllers that provide information about the external or ambient environment that surrounds the vehicle. Such external environment information is often collected in real time, but is limited to information indicative of the localized environmental conditions in the region proximate the vehicle. Such information, if used to alter or adjust operating parameters of the vehicle, tends to provide such adjustments in a reactive environment, after the environmental conditions have already began to affect one or more operational aspects of the vehicle (e.g., altitude, speed, direction). The impact of environmental forces on unmanned, autonomous, or remotely controlled vehicles such as airborne drones may be particularly harsh, resulting in loss of the vehicle before human or autonomously reactive systems are able to compensate for the rapid, often unexpected, imposition of environmental forces on the vehicle.

The autonomous proactive vehicular control systems and methods disclosed herein use data obtained from vehicular sensors to detect upcoming environmental events occurring along the direction of travel of a vehicle. Environmental events such as wind and precipitation may be detected based at least in part upon the impact each has on various objects, such as tree leaves, flags, waste paper, and such. For example, a three-dimensional camera may be used to obtain a number of still images or a sequence of still images that include a tree having a number of leaves. Based on the speed and direction of movement of the leaves, an image analysis circuit may identify the leaves and use one or more physical properties logically associated with the leaves to predict an expected wind speed and direction proximate the tree. Such may occur prior to the vehicle's arrival proximate the tree, i.e., before the wind exerts a force on the vehicle. By predicting an expected environmental force, one or more vehicle operating parameters may be autonomously altered or adjusted to minimize the impact of the predicted expected environmental force on the vehicle. In extreme conditions, vehicle routing may be autonomously adjusted to mitigate or avoid the impact of the environmental force on the vehicle.

As used herein, the term "vehicle" includes any number and/or combination of and current and/or future developed devices and/or systems capable of terrestrial and/or airborne movement. Such vehicles may include manned vehicles or unmanned vehicles. Such vehicles may include human-operated vehicles or autonomously operated vehicles. Such vehicles may include human controlled or autonomously operated robots or similar devices capable of movement or motion.

As used herein, the term "vehicle operating parameter" may include any number and/or combination of vehicular systems capable of affecting the speed, direction of travel, and/or control of a vehicle. Such vehicle operating parameters are, by their nature, often dependent on the vehicle itself. For example, vehicle operating parameters for an automobile may include systems such as acceleration, braking, engine speed, vehicular speed, and direction of travel while vehicle operating parameters for an airborne drone may include elevation, rate of ascent, rate of descent, airspeed, ground speed, vertical airspeed, and horizontal airspeed in addition or in the alternative to those automobile parameters listed above.

A proactive vehicle control system for vehicles is provided. The system may include a vehicle that includes a vehicle chassis. The system may further include at least one data acquisition device operably coupled to the vehicle chassis and a circuit communicably coupled to the at least one data acquisition device. The system may also include a storage device communicably coupled to the circuit, the storage device including a machine-readable instruction set.

The machine-readable instruction set may, when executed by the circuit, cause the circuit to provide a proactive vehicle controller that: acquires data indicative of at least one environmental event within a field-of-view of the at least one data acquisition device; predicts, based at least on the acquired at least one environmental event data, at least one expected force on the vehicle chassis; and proactively alters at least one operating parameter of the vehicle to at least partially compensate for the at least one predicted expected force on the vehicle chassis.

A proactive vehicle controller is provided. The proactive vehicle controller may include a circuit and a storage device communicably coupled to the circuit, the storage device including a machine-readable instruction set. The machine-readable instruction set may, when executed by the circuit, cause the circuit to: acquire data indicative of at least one environmental event within a field-of-view of at least one communicably coupled data acquisition device; predict at least one prospective force exerted on a vehicle chassis by the at least one environmental event; and proactively alters at least one operating parameter of a vehicle to at least partially compensate for the at least one predicted prospective force exerted on the vehicle chassis.

A storage device that includes machine-readable instructions that, when executed by a circuit, may cause the circuit to provide a proactive vehicle controller is provided. The machine-readable instructions may cause the proactive vehicle controller to: acquire data indicative of at least one environmental event within a field-of-view of at least one communicably coupled data acquisition device carried by a vehicle; predict at least one prospective force exerted on the vehicle by the at least one environmental event; and proactively alter at least one operating parameter of the vehicle to at least partially compensate for the predicted at least one prospective force.

A proactive vehicle control method is provided. The method may include acquiring, by a proactive vehicle controller, data indicative of at least one environmental event within a field-of-view of at least one communicably coupled data acquisition device carried by a vehicle and communicably coupled to the route guidance controller. The method may further include predicting, by the proactive vehicle controller, at least one prospective force exerted on the vehicle by the at least one environmental event; and proactively altering, by the proactive vehicle controller, at least one operating parameter of the vehicle to at least partially compensate for the predicted at least one prospective force.

A proactive vehicle control system is provided. The proactive vehicle control system may include a means for acquiring data indicative of at least one environmental event external to a vehicle. The system may further include a means for predicting at least one prospective force exerted on a chassis of the vehicle by the at least one environmental event and a means for proactively altering at least one operating parameter of the vehicle to at least partially compensate for the predicted at least one prospective force.

FIG. 1 provides a high-level schematic diagram of an illustrative autonomous proactive vehicular control system 100, in accordance with at least one embodiment of the present disclosure. As depicted in FIG. 1, a vehicle 102 may include a chassis 104, a number of vehicular systems 106, a circuit 108, a storage device 110, and one or more data acquisition devices 112. In at least some implementations, the number of vehicular systems 106, the circuit 108, the storage device 110, and the one or more data acquisition devices 112 may be operably coupled to and carried by the chassis 104.

The vehicle 102 may travel at a fixed or variable speed in a direction of travel 116 towards a destination 120. In some implementations, data such as geolocation information logically associated with the destination 120 may be supplied to the circuit 108 and stored, for example, in a memory within the one or more storage devices 110. In embodiments, based on a destination 120 provided by a vehicle user, the routing information, including speed, direction of travel, waypoints, etc. may be autonomously determined, in whole or in part by the circuit 108. In other embodiments, the vehicle user may provide some or all of the routing information, including speed, direction of travel, and waypoints. The information indicative of the destination 120 may be provided in the form of a geographic location (e.g., a designated longitude and latitude), a named location or landmark (e.g., the Seattle Space Needle), or an address (e.g., 531 Main Street, Muncie, Ind.).

In embodiments, one or more environmental events 130 may be present along the direction of travel 116 of the vehicle 102. Such environmental events 130 may generate or otherwise produce physical and/or electromagnetic forces 132 of sufficient magnitude to impact the vehicle 102. Such environmental events 130 may include one or more naturally occurring events, one or more manmade events, or any combination thereof. In embodiments, such environmental events 130 may be transient in nature, for example, one or more events generated by one or more natural or manmade acts and dissipating over time. Such environmental events 130 may include a geographically localized environmental event such as a tornado, or a geographically diverse environmental event such as a cold front or low pressure system spawning severe weather. Non-limiting examples of such environmental events 130 may include, but are not limited to winds and lightning.

The mechanical and/or electromagnetic forces 132 generated by the environmental event 130 may impact objects within the localized area of the environmental event 130. For example, an environmental event 130 such as wind shear may cause an object 140 such as leaves, flags, or paper debris to move, be displaced, or flutter along a vector 142 having a direction and magnitude or velocity that is based at least in part on the direction and force 132 exerted on the object 140 by the environmental event 130. In another example, an environmental event 130 such as lightning may cause a sudden increase and decrease in ambient brightness. The one or more data acquisition devices 112 may generate one or more output signals including information or data indicative of the movement of the object 140 over a defined time interval.

Using some or all of the information or data included in the output signal provided by the one or more data acquisition devices 112, the circuit 108 may determine an approximate magnitude and direction of force 132 exerted by the environmental event 130. Based at least in part on the determined magnitude and direction of the force 132, the circuit 108 may proactively control, alter, or adjust one or more vehicular systems 106. In embodiments, such proactive control, alteration, or adjustment of at least one of the number of vehicular systems 106 may minimize or eliminate the impact of the environmental event 130 on the vehicle 102.

The vehicle 102 may include any current or future developed device, system, or combinations thereof that incorporate a chassis 104 capable of movement and capable of carrying at least the number of vehicular systems 106, the circuit 108, the storage device 110, and the one or more data acquisition devices 112. The vehicle 102 may include, but is not limited to, an aerial drone, a mechanical robot, an automobile, or any similar current or future developed mobile device capable of movement or motion within a three-dimensional environment. In embodiments, the vehicle 102 includes a chassis 104 to which various components are mounted, affixed, or otherwise attached. In some instances, the chassis 104 may include a single member or multiple member rigid frame as exemplified by a rigid automobile or aerial drone chassis 104. In other instances, the chassis 104 may include a multiple member articulated or movable frame as exemplified by an articulable chassis 104 supporting a robot or similar device. The chassis 104 may include any number or combination of metallic and/or non-metallic members.

Each of the number of vehicular systems 106 may include any current or future developed device, system or combination thereof capable of controlling, altering, and/or adjusting one or more operating parameters of the vehicle 102. In implementations, each of the number of vehicular systems 106 may control, alter, and/or adjust one or more operating aspects of the vehicle 102. Non-limiting examples of vehicular operating aspects include, but are not limited to, vehicle speed, vehicle direction, vehicle acceleration/deceleration, and the like. Non-limiting examples of vehicular systems 106 include, but are not limited to, engine control, acceleration, braking, directional control, altitude control, yaw control, pitch control, and similar. The vehicular systems 106 may be specific to a particular vehicle type or vehicle class. For example, an aerial drone vehicle 102 may include vehicular systems 106 such as engine or motor (operational aspects include speed, performance, torque), flaps (operational aspects include position, displacement), propeller pitch (operational aspects include angle of attack), and ailerons (operational aspects include position, displacement). In another example, a robotic vehicle 102 may include vehicular systems 106 such as: rotating actuators (operational aspects include speed, displacement, position), linear actuators (operational aspects include speed, displacement, position), and engine or motor (operational aspects include speed, performance, torque).

The circuit 108 may include any number and/or combination of any current and/or future developed electronic components and/or semiconductor devices capable of executing a machine readable instruction set. In implementations, upon executing the machine-readable instruction set, the circuit 108 may function as and/or provide a specific and dedicated proactive vehicular controller 108. In some implementations, the circuit 108 may include all or a portion of one or more processors, microprocessors, controllers or similar.

In embodiments, the circuit 108 may estimate or otherwise predict the force 132 exerted by the environmental event 130 on the vehicle 102, based at least on part on the information and/or data representative of the vector 142 (i.e., the speed and direction) of one or more objects 140 included in the output signal provided by the one or more data acquisition devices 112. In some implementations, the circuit 108 may include one or more object identification, object recognition or similar functionalities permitting the proactive vehicular controller 108 to identify various types and/or classes of objects 140. In some embodiments, the circuit 108 may estimate or otherwise predict the force 132 exerted by the environmental event 130 based at least in part on physical attributes (e.g., density, buoyancy, size, composition, and similar) logically associated with a particular type or class of object 140. In some implementations, the storage device 110 may store or otherwise retain one or more data tables, data stores, databases or similar logical structures that include data indicative of a logical association between various types or classes of objects 140 and one or more physical attributes of the respective object.

In some implementations, the circuit 108 may include one or more threads executed by one core of a multicore microprocessor. In some implementations, the circuit 108 may directly control some or all of the number of vehicular systems 106. In some implementations, the circuit 108 may interface with one or more other devices that control some or all of the number of vehicular systems 106. In implementations, the circuit 108 may optionally include one or more wireless communication interfaces. Such wireless communication interfaces may include, but are not limited to, one or more cellular transceivers (3G, 4G, GS, CDMA, etc.); one or more BLUETOOTH® transceivers; one or more IEEE 802.11 (WiFi®) transceivers; or combinations thereof.

The storage device 110 may include any number and/or combination of any current and/or future developed electronic components and/or semiconductor devices capable of storing or otherwise retaining digital information or data. In some implementations, the storage device 110 may store or otherwise retain one or more machine-readable instruction sets for execution by the circuit 108. In some implementations, the circuit 108 may provide some or all of the storage device, for example in the form of a cache memory or in the form of an electrically erasable programmable read only memory (EEPROM). In embodiments, the storage device 110 may include one or more data tables, data stores, or databases in which such physical attributes are logically associated with various types or classes of objects 140. In embodiments, the storage device 110 may include, but is not limited to, the at least one machine-readable instruction set executed by the circuit 108 to provide the proactive vehicle controller.

In some implementations, the storage device 110 may include one or more data storage devices physically separated from, but communicably coupled to, the circuit 108. In such implementations, the storage device 110 may include one or more rotating storage devices, one or more electrostatic storage devices, one or more semiconductor storage devices, one or more electroresistive storage devices, one or more molecular storage devices, one or more quantum storage devices, one or more atomic storage devices, or combinations thereof. In some implementations, all or a portion of the storage device 110 may be implemented as remote storage, for example in the form of a remote storage server or "cloud-based" storage.

The one or more data acquisition devices 112 may include any number and/or combination of any current and/or future developed electronic components and/or semiconductor devices capable of perceiving one or more events in the external environment about the vehicle 102. Each of the one or more data acquisition devices 112 generates an output signal that is routed to the circuit 108. The output signal generated by each of the one or more data acquisition devices 112 includes, carries, or contains data and/or information indicative of the one or more events in the external environment about the vehicle 102.

In embodiments, the one or more data acquisition devices 112 may include one or more image acquisition devices 112. In some implementations, the one or more image acquisition devices 112 may include an image acquisition device capable of acquiring or otherwise collecting image data within a field-of-view 114 in all or a portion of the human-visible portion of the electromagnetic spectrum of from about 380 nanometers (nm) to about 760 nm. In some implementations, the one or more image acquisition devices 112 may include one or more image acquisition devices 112 capable of acquiring or otherwise collecting image data in a field-of-view 114 in all or a portion of the non-human visible portion of the electromagnetic spectrum of less than about 380 nm or greater than about 760 nm. In some implementations, the image acquisition device may include multiple devices to capture data representative of images and motion occurring within the field-of-view 114 of the device. Such a device may include a visible object image acquisition device, an infrared sensitive image acquisition device, and an infrared laser projector, such as the RealSense® camera supplied by Intel®, Inc. (Santa Clara, Calif.).

In some instances, the field-of-view 114 of the one or more sensors 112 may include only a limited arc, for example covering the direction of travel 116 of the vehicle 102. In some instances, the field-of-view 114 of the one or more sensors 112 may include a 360° bubble about the vehicle 102 such that remote environmental events 130 occurring above, below, or all around the vehicle 102 are detected by the one or more sensors 112 and the circuit 108 is able to take appropriate prospective actions to avoid the force 132 generated by the remote environmental event 130.

In embodiments, the one or more data acquisition devices 112 may include any number and/or combination of devices and/or systems capable of detecting one or more environmental events remote from the vehicle 102. Environmental events 130 remote from the vehicle 102 include naturally occurring environmental events 130 that generate a force 132 sufficient to impact, upset, destabilize, or otherwise adversely affect one or more mechanical, electrical, or electromechanical systems carried by the vehicle 102. Such mechanical, electrical, or electromechanical systems may impact or otherwise compromise the stability of the vehicle 102 to an extent that the vehicle 102 becomes at least temporarily uncontrolled or uncontrollable.

The one or more data acquisition devices 112 may include, but are not limited to, one or more electrostatic discharge sensors, one or more precipitation sensors, one or more single- or multi-axis accelerometers, one or more humidity sensors, one or more pressure sensors, one or more light sensors, or combinations thereof. Sensor combinations may advantageously permit the proactive detection of events such as thunderstorms (electrostatic discharge, rapidly dropping pressure, and reduced light) or similar events.

The one or more data acquisition devices 112 may detect at least one occurrence of an environmental event 130 remote from the vehicle 102. Detection of a remote environmental event 130 includes detecting an occurrence of the environmental event 130 with sufficient time for the circuit 108 to detect and/or confirm the occurrence of the event 130, predict the force 132 generated by the event 130, and proactively take one or more measures to mitigate the impact of the force 132 on the vehicle 102 prior to reaching the location or site of the environmental event 130 where the force 132 is encountered.

In some implementations, the vehicle 102 may report or otherwise transmit environmental event information and/or data to one or more remote storage locations via a network 150. The network 150 may include one or more wireless local area networks (WLANs), one or more metropolitan area networks (MANs), one or more wide area networks (WANs), one or more worldwide area networks (WWANs), or combinations thereof. The one or more remote storage locations may include one or more servers 152 or one or more remote, processor-based, computing devices 154. In some implementations, the one or more servers 152 and/or the one or more remote, processor-based devices 154 may include one or more data tables, data stores, databases, or similar data storage structures that store or otherwise retain data or information representative of the logical association between types or classes of objects 140 and the physical parameters of the respective object. In some implementations, some or all of the object identification and/or object recognition performed by the circuit 108 may be allocated to the one or more servers 152 and/or the one or more remote processor based devices 154.

In implementations, the vehicle 102 may report or otherwise transmit environmental event information and/or data to one or more cloud-based servers. In some implementations, such environmental event information may include image data, for example three-dimensional image data from which environmental information or data may be manually or autonomously extracted or otherwise obtained. Such environmental data may be uploaded, for example, to servers that include weather or similar environmental data. Examples of such servers may include commercial weather data servers such as www.weather.com, www.wunderground.com, and similar. Other examples of such servers may include governmental or academic weather or environmental data servers such as: the national oceanic and atmospheric administration (www.noaa.gov); the national hurricane center (www.nhc.noaa.gov); and similar. Beneficially, the ability to provide precise geolocation information along with environmental data or information on a real-time or near real-time basis along a direction of travel of the vehicle 102 provides the unprecedented ability to detect weather and other environmental conditions with a granularity heretofore unachievable using current state of the art equipment.

In implementations, the collection of weather or environmental information may provide a revenue generation opportunity. Various commercial weather services may incentivize the collection and transmission of environmental or weather-related data. In some implementations, such incentivized data collection may be used by the circuit 108 to determine a travel path or itinerary for a vehicle 102 (e.g., perform a financial or risk/reward analysis on a direction of travel diversion to obtain incentivized environmental data). In such implementations, a vehicle 102 may, for example, be used to capture data or information on environmental or weather events that are transient in nature and consequently rarely encountered. In implementations, such as implementations where a 3D camera is used to collect environmental data, the presence of additional environmental or geographic information may be sufficient to verify the time, date, location, and veracity of the collected environmental or weather data.

Figure 2:
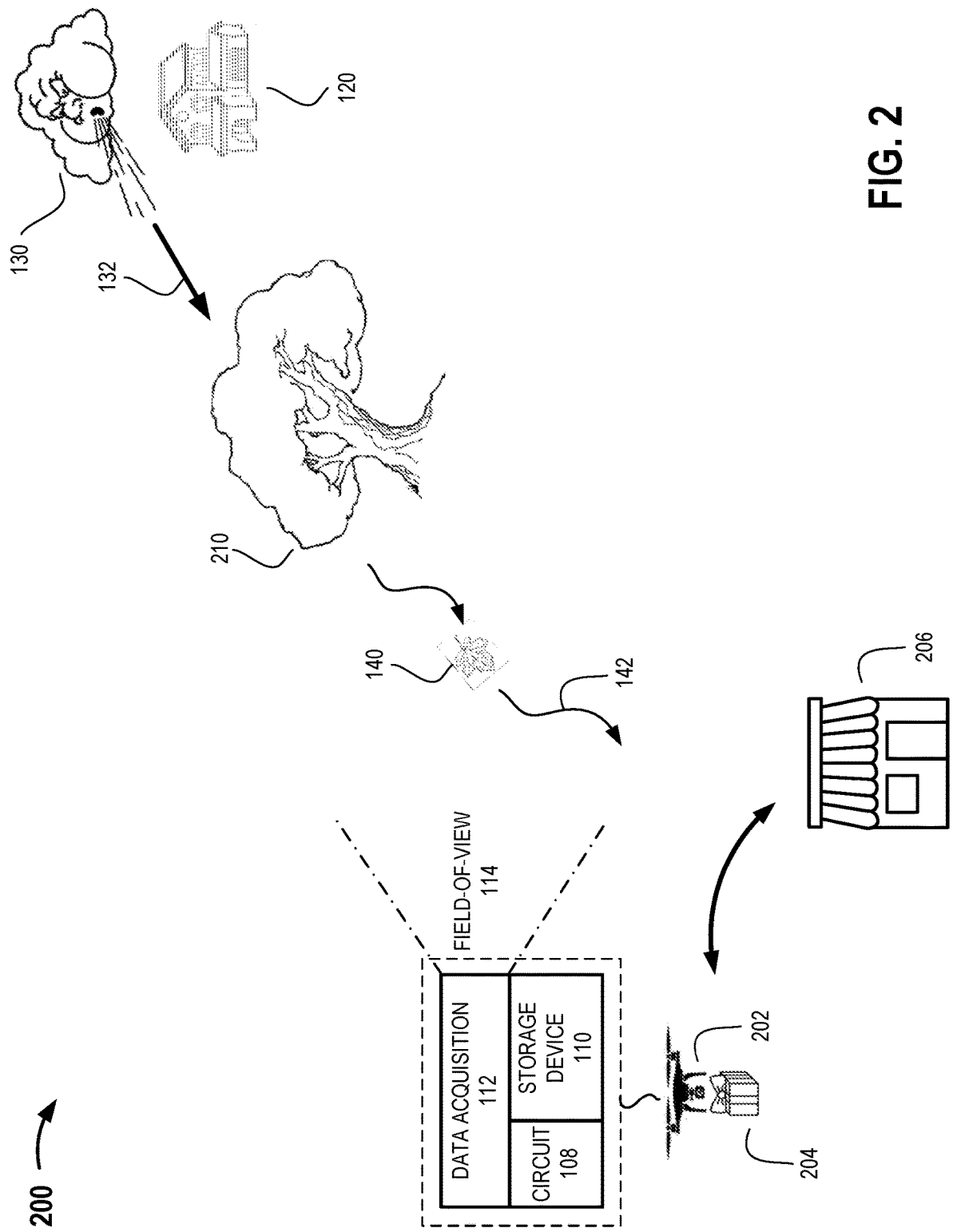
FIG. 2 provides a schematic diagram of an illustrative autonomous proactive vehicular control system in use with an airborne drone, in accordance with at least one embodiment of the present disclosure.

FIG. 2 provides a schematic diagram of an illustrative autonomous proactive vehicular control system 200 in use with an airborne drone 202, in accordance with at least one embodiment of the present disclosure. As depicted in FIG. 2, an airborne drone 202 may be used to convey an article 204 such as a package from an origin location 206 (e.g., a non-brick and mortar or Web store) to a destination 120 (e.g., a home). Enroute to the destination 120, an environmental event (e.g., wind) occurs and exerts a force 132 on a tree 210. The force 132 causes an object 140 (a leaf) to separate from the tree and follow a vector 142 determined by the strength and direction of the force 132 exerted by the environmental event 130.

Prior to encountering the force 132 provided by the environmental event 130, the one or more data acquisition devices 112 detect the movement of the object 140. In at least some embodiments, the one or more data acquisition devices 112 may include a RealSense® camera or similar device that provides both data representative of an image of the object 140 and data representative of the vector 142 (speed and direction) of the object 140. Using some or all of the image data provided by the one or more data acquisition devices 112, the circuit 108 identifies the object 140 as a leaf. The circuit 108 may obtain one or more physical attributes logically associated with a leaf from one or more data stores retained in the storage device 110. Using the physical attributes logically associated with the leaf and the data representative of the vector 142 taken by the leaf, the circuit predicts an expected force the environmental event 130 will exert on the chassis 104 of the airborne drone 202.

In embodiments, the circuit 108 may determine the predicted expected force exerted by the environmental event 130 on the vehicle chassis 104 (the drone chassis in this example) in real-time or near real-time. Such real-time or near-real time prediction of force 132 exerted on the vehicle chassis 104 prior to the vehicle 102 experiencing the force 132 beneficially permits a proactive change, alteration, adjustment, or modification of one or more vehicle parameters to minimize or even eliminate the effect of the force 132 on the vehicle 102.

After predicting the force 132 the environmental event 130 will exert on the drone chassis 104, the circuit 108 may alter, adjust, modulate, modify, or otherwise control one or more vehicular systems 106 to compensate for the expected force 132. Such proactive measures may beneficially mitigate the impact of the force 132 on the vehicle 102. Such proactive measures may also beneficially permit the autonomous vehicle or vehicle operator to retain control of the vehicle 202 when the force is encountered.

Figure 3:
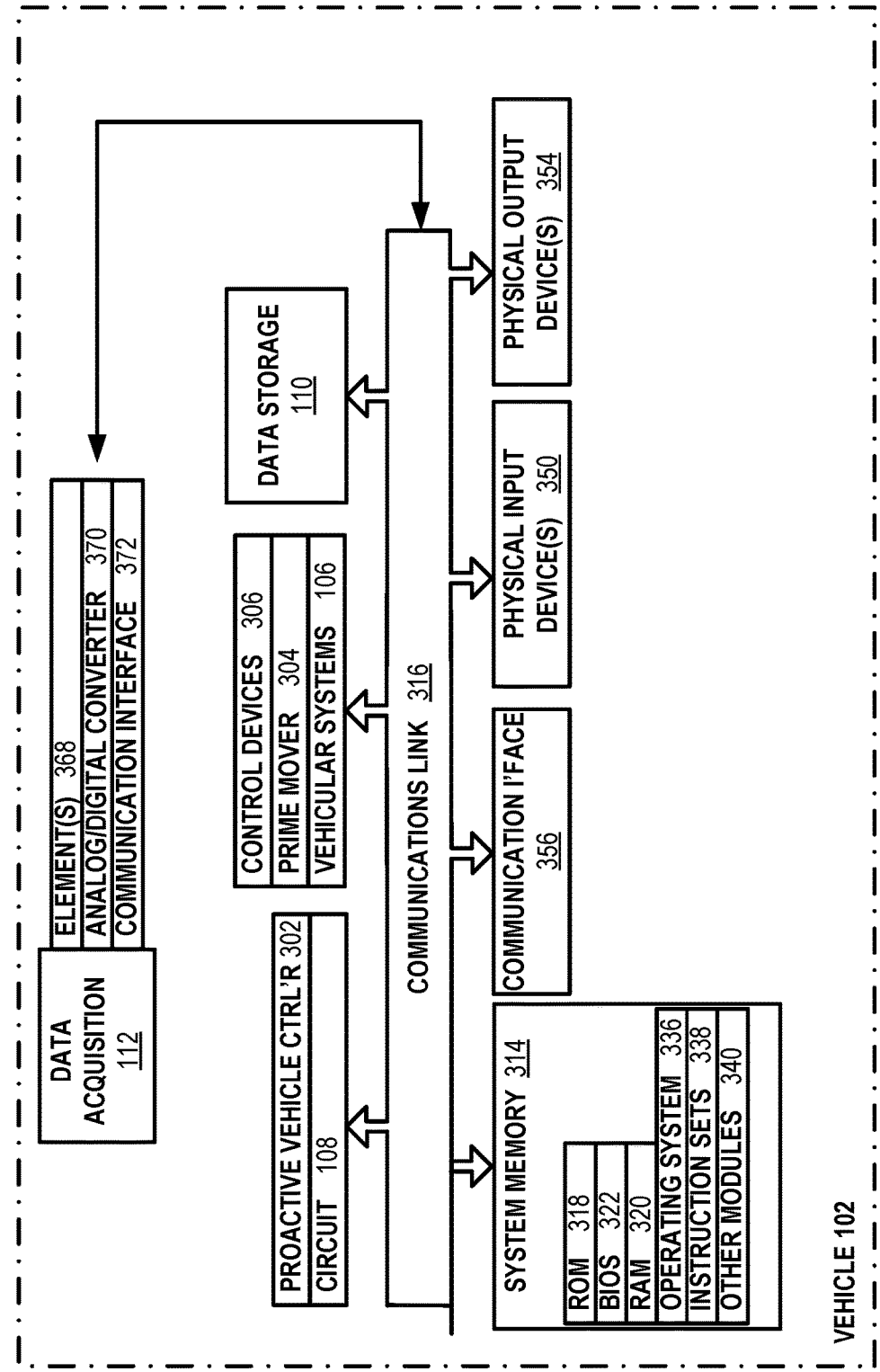
FIG. 3 provides a block diagram of an illustrative processor-based device in which the autonomous proactive vehicular control system may be implemented, in accordance with at least one embodiment of the present disclosure.

FIG. 3 and the following discussion provide a brief, general description of the components forming a vehicle 102 equipped with a one or more data acquisition devices 112 and circuit 108 that functions as a specific and particular a proactive vehicle controller 302, in accordance with one or more embodiments described herein. Although not required, some portion of the embodiments will be described in the general context of machine-readable or computer-executable instruction sets, such as program application modules, objects, or macros being executed by the circuit 108. Those skilled in the relevant art will appreciate that the illustrated embodiments as well as other embodiments can be practiced with other types and/or classes of vehicles equipped with one or more data acquisition devices 112 and one or more circuits 108 capable of providing proactive vehicle controller 302. The one or more circuits 108 may include, without limitation, portable electronic or handheld electronic devices, for instance smartphones, portable computers, wearable computers, microprocessor-based or programmable consumer electronics, and the like.

The vehicle 102 may include any number of circuits 108, some or all of which may include electronic devices and/or semiconductor components that are coupled, connected, or otherwise disposed in a configurable or non-configurable combination capable of executing machine-readable instruction sets. The vehicle 102 may include a serial or parallel communications bus or link 616 that couples various vehicular systems 106, sub-systems, modules, or components including the data storage device 110, a communications interface 356, a physical input device 350, a physical output device 354, and a system memory 314 to the circuit 108.

The circuit 108 may include any number, type, or combination of electronic devices and/or semiconductor components that may be selectively communicably coupleable based at least in part on instructions provided during the execution of one or more machine-readable instruction sets. At times, the circuit 108 may be implemented in whole or in part in the form of semiconductor devices such as diodes, transistors, inductors, capacitors, and resistors. Such an implementation may include, but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), field programmable gate arrays (FPGAs), and the like. Unless described otherwise, the construction and operation of the various blocks shown in FIG. 3 are of conventional design. As a result, such blocks need not be described in further detail herein, as they will be understood by those skilled in the relevant art. The communications link 316 that interconnects at least some of the components may employ any known serial or parallel bus structures or architectures.

The system memory 314 may include read-only memory ("ROM") 318 and random access memory ("RAM") 320. A portion of the ROM 318 may contain a basic input/output system ("BIOS") 322. The BIOS 322 may provide basic functionality, for example by causing the circuit 108 to load and execute one or more machine-readable instruction sets that cause the circuit 108 to function as a dedicated, specific, and particular machine, such as the proactive vehicle controller 302.

The vehicle 102 may include one or more non-transitory, data storage devices 110. The one or more data storage devices 110 may include any current or future developed non-transitory storage devices. Non-limiting examples of such data storage devices 110 may include, but are not limited to any current or future developed nontransitory storage appliances or devices, such as one or more magnetic storage devices, one or more optical storage devices, one or more solid-state electromagnetic storage devices, one or more electroresistive storage devices, one or more molecular storage devices, one or more quantum storage devices, or various combinations thereof. In some implementations, the one or more data storage devices 110 may include one or more removable storage devices, such as one or more flash drives, compact flash (CF) drives, secure digital (SD) drives, or similar appliances or devices.

The one or more storage devices 110 may include interfaces or controllers (not shown) communicatively coupling the respective storage device or system to the communications link 316, as is known by those skilled in the art. The one or more storage devices 110 may contain machine-readable instruction sets, data structures, program modules, data stores, databases, logical structures, and/or other data useful to the proactive vehicle controller 302, such as a data store that includes data or information indicative of physical attributes logically associated with various types or classes of objects 104.

Machine-readable instruction sets 338 and other modules 340 may be stored in whole or in part in the system memory 314. Such instruction sets 338 may be transferred from one or more storage devices 110 and stored in the system memory 314 in whole or in part as the machine-readable instruction sets are executed by the circuit 108. The machine-readable instruction sets 338 may include instructions or similar executable logic capable of providing the autonomous proactive vehicle control system described herein.

For example, one or more machine-readable instruction sets 338 may cause the proactive vehicle controller 302 to use data or information carried by at least one output signal provided by the one or more data acquisition devices 112 to acquire an image of and identify an object 140 passing through the field-of-view 114 of the at least one data acquisition device 112. One or more machine-readable instruction sets 338 may cause the proactive vehicle controller 302 to use data or information carried by at least one output signal provided by the one or more data acquisition devices 112 to determine a vector quantity (i.e., speed and direction) 142 corresponding to the direction of travel of the object 140.

One or more machine-readable instruction sets 338 may cause the proactive vehicle controller 302 to use some or all of the information or data provided by the one or more data acquisition devices 112 to determine a class or type of the object 140. In at least some implementations, the proactive vehicle controller 302 may access object information or data included in one or more data stores, data structures, or databases stored or otherwise retained in the communicably coupled storage device 110.

One or more machine-readable instruction sets 338 may cause the proactive vehicle controller 302 to determine one or more physical aspects logically associated with the class or type of object 140. In at least some implementations, the proactive vehicle controller 302 may access physical aspect information or data included in one or more data stores, data structures, or databases stored or otherwise retained in the communicably coupled storage device 110.

One or more machine-readable instruction sets 338 may cause the proactive vehicle controller 302 to predict a projected force 132 that the environmental event 130 will exert on the vehicle chassis 104. In some implementations, the proactive vehicle controller 302 may predict the projected force based at least in part on the physical attributes of the object 140.

One or more machine-readable instruction sets 338 may cause the proactive vehicle controller 302 to alter, modify, control, adjust, or otherwise manipulate one or more vehicular systems 106 to minimize or mitigate the effect of the projected force 132 on the vehicular chassis 104.

In embodiments, commands (acknowledgements, selections, confirmations, etc.) as well as information (additional object physical attribute data, etc.) may be provided, entered or otherwise supplied to the circuit 108 and/or the proactive vehicle controller 302 via one or more physical input devices 350. In embodiments, output may be provided or otherwise supplied by the circuit 108 and/or the proactive vehicle controller 302 via one or more physical output devices 354.

For convenience, the circuit 108 and/or the proactive vehicle controller 302, the system memory 314, the physical input devices 350 and the physical output devices 354 are illustrated as communicatively coupled to each other via the communications link 316, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In some embodiments, all or a portion of the communications link 316 may be omitted and the components are coupled directly to each other using suitable tethered, hardwired, or wireless connections.

Each of the one or more data acquisition devices 112 may include one or more sensing elements 368, one or more analog to digital converters 370, and one or more communications interfaces 372. The one or more sensing elements 112 may include, but is not limited to, one or more visible image acquisition devices, one or more infrared image acquisition devices, one or more infrared illuminators, one or more pressure sensors, one or more humidity sensors, one or more temperature sensors, one or more ambient light sensors, one or more electrostatic discharge sensors, or combinations thereof.

Each of the one or more data acquisition devices 112 may include one or more signal transformation and/or processing devices or systems, such as one or more analog-to-digital (A/D) converters 370 capable of converting the analog output signal to a digital output signal that contains the data or information representative of the condition or parameter sensed and/or detected by the respective one or more data acquisition devices 112. Each of the one or more data acquisition devices 112 may include one or more communications interfaces 372 capable of outputting the signal provided by the one or more sensor elements 368 and/or the A/D converter 370 to the proactive vehicle controller 302.

Figure 4:
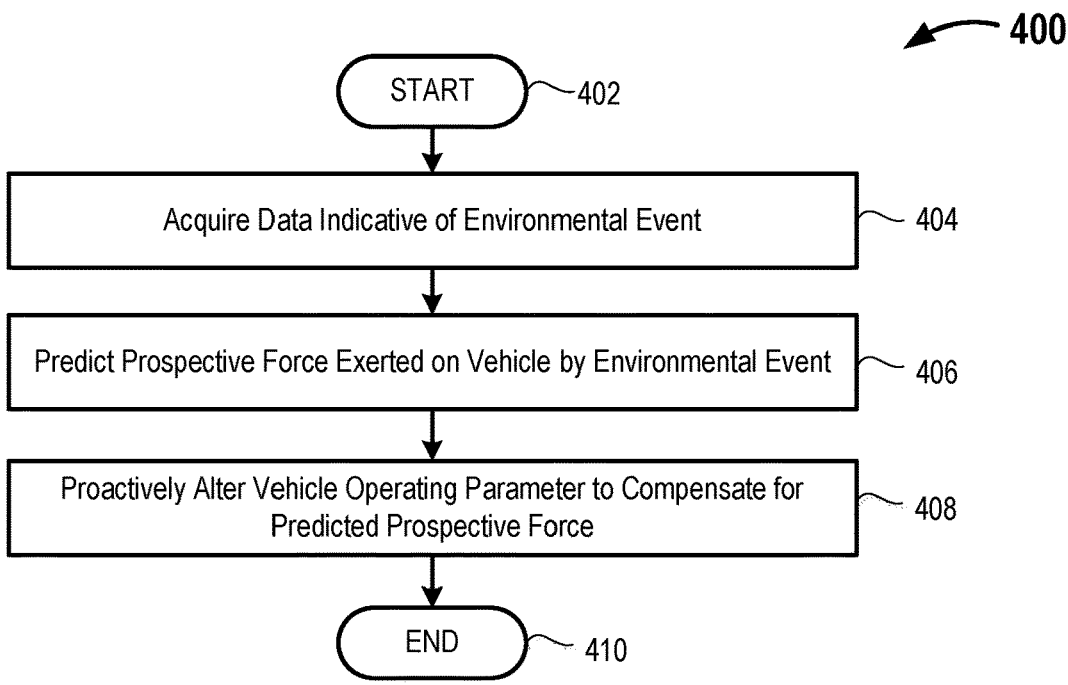
FIG. 4 provides a high-level flow diagram of an illustrative autonomous proactive vehicular control method, in accordance with at least one embodiment of the present disclosure.

FIG. 4 provides a high-level logic flow diagram of an illustrative proactive vehicle control method 400, in accordance with at least one embodiment described herein. Environmental events 130 such as wind and lightning produce mechanical and/or electrical forces 132 proximate the event. Relatively light weight vehicles 102, such as aerial drones, may be adversely impacted by the forces 132 generated by these environmental events 130. In embodiments, a vehicle 102 may be provided with one or more data acquisition device 112 to detect such environmental events and a proactive vehicle controller 302 to predict an expected force 132 on the vehicle chassis 104 and proactively alter, adjust, or control one or more vehicle parameters to minimize or mitigate the impact of the force 132 on the vehicle 102. The method 400 commences at 402.

At 404, the proactive vehicle controller 302 acquires data indicative of an occurrence of an environmental event 130 along the direction of travel 116 of the vehicle 102. In embodiments, such data may be acquired using one or more data acquisition devices 112 capable of directly or indirectly detecting the occurrence of the environmental event 130. In some implementations, the one or more data acquisition devices 112 may indirectly detect the occurrence of the environmental event 130 based on the movement, motion, oscillation, or similar displacement of one or more objects 140. For example, the one or more data acquisition devices 112 may detect the movement of a leaf, a tree limb, a flag, a piece of waste paper, or similar objects caused by an environmental event 130 such as a sudden gust of wind. In other implementations, the one or more data acquisition devices 112 may directly detect the occurrence of the environmental event 130. For example, the one or more data acquisition devices 112 may directly detect lightning using either or both an electrostatic discharge sensor and/or an ambient light sensor.

In some implementations, in addition to directly or indirectly detecting the occurrence of the environmental event 130, the output signal provided by the one or more data acquisition devices 112 may include data indicative of the distance between the vehicle 102 and the environmental event 130. Such data or information may advantageously permit the proactive vehicle controller 302 sufficient time to alter, adjust, or otherwise control one or more vehicular systems 106 to minimize or otherwise mitigate the force 132 exerted by the environmental event 130 on the vehicle 102.

At 406, the proactive vehicle controller 302 predicts the prospective force 132 exerted on the vehicle chassis 104 by the environmental event 130. In some implementations, the proactive vehicle controller 302 may use one or more physical attributes logically associated with an object 140 detected by the one or more data acquisition devices 112 to determine or otherwise estimate the force 132 generated by the environmental event 130. In at least some implementations, the physical attributes logically associated with particular object types or classes may be stored or otherwise retained in the storage device 110 as one or more data tables, data stores, databases, or other similar data structures. In some implementations, the proactive vehicle controller 302 may predict the prospective force 132 exerted on the vehicle chassis 104 by the environmental event 130. In other implementations, the proactive vehicle controller 302 may receive data indicative of the predicted prospective force 132 exerted on the vehicle chassis 104 by the environmental event 130 from one or more remote devices, for example from one or more servers 152 or similar network connected remote processor-based devices 154.

At 408, based at least in part on the predicted prospective force 132, the proactive vehicle controller 302 proactively alters, adjusts, modifies, controls, or otherwise changes one or more vehicular systems 106 to alter one or more vehicular operating parameters to minimize or otherwise mitigate the effect of the predicted prospective force 132 on the vehicle 102. In some implementations, the proactive vehicle controller 302 may directly alter, adjust, modify, control or change the one or more vehicular system 106. In other implementations, the proactive vehicle controller 302 may indirectly alter, adjust, modify, control or change the one or more vehicular system 106, for example by causing a second controller to alter, adjust, modify, control or change the one or more vehicular system 106. The method 400 concludes at 410.

Figure 5:
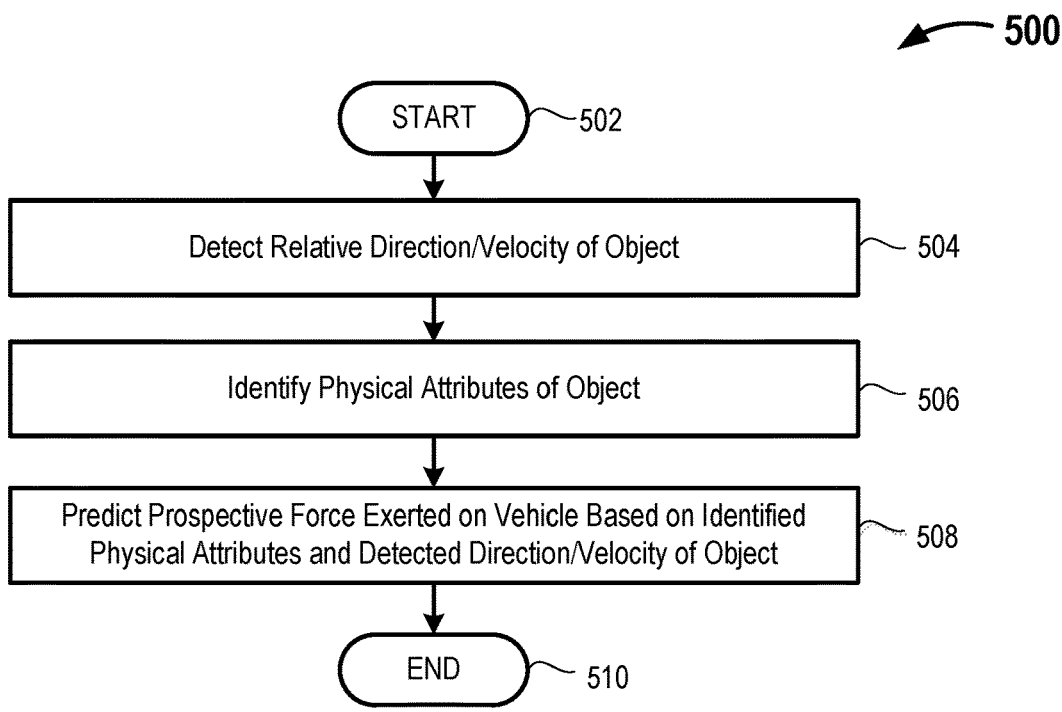
FIG. 5 provides a high-level flow diagram of another illustrative autonomous proactive vehicular control method, in accordance with at least one embodiment of the present disclosure.

FIG. 5 provides a high-level logic flow diagram of an illustrative prospective force 132 prediction method 500 that may be used by the proactive vehicle controller 302, in accordance with at least one embodiment described herein. In embodiments, the proactive vehicle controller 302 may predict the prospective force 132 generated by an environmental event 130 and exerted on the vehicle chassis 104 based at least in part on the movement, motion, oscillation, or displacement of one or more objects 140 within the field-of-view 114 of the one or more data acquisition devices 112. The method 500 commences at 502.

At 504, the proactive vehicle controller 302 receives data or information indicative of a direction and speed or velocity of an object 140 within the field-of-view 114 of the one or more data acquisition devices 112. In some implementations, the direction and velocity or speed of the object 140 may be measured relative to the direction and velocity or speed of the vehicle 104. Such may be accomplished, for example, using one or more accelerometers and/or one or more gyroscopic devices disposed in, on, or about the vehicle 102.

At 506, the proactive vehicle controller 302 identifies one or more physical aspects logically associated with the object 140. In some implementations, the proactive vehicle controller 302 may identify the object 140 as a member of a particular class or type of object 140. Such may be accomplished, for example, by applying object recognition and/or object identification to at least a portion of the image data received from the one or more data acquisition devices 112. In embodiments, once the proactive vehicle controller 302 has identified the object 140, the proactive vehicle controller 302 may identify the physical aspects logically associated with the object 140 using one or more data tables, data stores, or databases stored or otherwise retained in the storage device 110.

At 508, the proactive vehicle controller 302 predicts the prospective force exerted on the vehicle chassis 104 based on the physical attributes of the object 140, the direction of motion of the object 140, and the velocity or speed of the object 140. In some implementations, the proactive vehicle controller 302 may determine the prospective force exerted on the vehicle chassis 104. In other embodiments, the proactive vehicle controller 302 may cooperatively determine the prospective force exerted on the vehicle chassis 104 with one or more remote servers 152 and/or one or more network connected processor-based devices 154. The method 500 concludes at 510.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a sub-combination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage device 110 may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for proactively adjusting one or more vehicle operational parameters based at least in part on a predicted force exerted on the vehicle by an environmental event such as a wind.

According to example 1, there is provided a proactive vehicle control system for vehicles. The system may include a vehicle that includes a vehicle chassis. The system may further include at least one data acquisition device operably coupled to the vehicle chassis and a circuit communicably coupled to the at least one data acquisition device. The system may also include a storage device communicably coupled to the circuit, the storage device including a machine-readable instruction set. The machine-readable instruction set may, when executed by the circuit, cause the circuit to provide a proactive vehicle controller that: acquires data indicative of at least one environmental event within a field-of-view of the at least one data acquisition device; predicts, based at least on the acquired at least one environmental event data, at least one expected force on the vehicle chassis; and proactively alters at least one operating parameter of the vehicle to at least partially compensate for the at least one predicted expected force on the vehicle chassis.

Example 2 may include elements of example 1 where the machine-readable instructions that cause the proactive vehicle controller to acquire data indicative of at least one environmental event within a field-of-view of the at least one data acquisition device, may further cause the proactive vehicle controller to acquire data indicative of at least one environmental event remote from the vehicle chassis and within the field-of-view of the at least one data acquisition device.

Example 3 may include elements of example 2 where the machine-readable instructions that cause the proactive vehicle controller to acquire data indicative of at least one environmental event remote from the vehicle chassis and within the field-of-view of the at least one data acquisition device, may further cause the proactive vehicle controller to acquire data indicative of at least one environmental event remote from the vehicle, within the field-of-view of the at least one data acquisition device, and along an intended direction of travel of the vehicle.

Example 4 may include elements of example 2 where the machine-readable instructions that cause the proactive vehicle controller to acquire data indicative of at least one environmental event remote from the vehicle and within the field-of-view of the at least one data acquisition device, may further cause the proactive vehicle controller to acquire data representative of at least one of a direction or a velocity of an object within the field-of-view of the at least one data acquisition device.

Example 5 may include elements of example 4 where the machine-readable instructions that cause the proactive vehicle controller to acquire data representative of at least one object within the field-of-view of the at least one data acquisition device, may further cause the proactive vehicle controller to identify at least one physical aspect logically associated with the at least one object within the field-of-view of the at least one data acquisition device.

Example 6 may include elements of example 5 where the machine-readable instructions that cause the proactive vehicle controller to predict, based at least on the acquired at least one environmental event data, the at least one prospective force on the vehicle chassis, may further cause the proactive vehicle controller to predict the at least one prospective force on the vehicle chassis based at least in part on the at least one physical aspect logically associated with the object and least one of the direction or the velocity of the object.

Example 7 may include elements of example 6 where the machine-readable instructions that cause the proactive vehicle controller to predict the at least one prospective force on the vehicle chassis based at least in part on the at least one physical aspect logically associated with the object and least one of the direction or the velocity of the object, further cause the proactive vehicle controller to predict the at least one prospective force on the vehicle chassis based at least in part on a detected change in the at least one object that includes at least one of: a change in a location of the at least one object; a change in a motion of the at one object; a change in an appearance of the at least one object; a change in a texture of the at least one object; or a change in a velocity of the at least one object.

Example 8 may include elements of example 1 where the vehicle chassis comprises a flyable drone chassis.

Example 9 may include elements of any of examples 1 through 8 where the at least one data acquisition device comprises an image acquisition device.

Example 10 may include elements of example 9 where the image acquisition device comprises a three-dimensional image acquisition device.

Example 11 may include elements of example 10 where the image acquisition device comprises a three-dimensional image acquisition device that, in operation, captures a sequence of three-dimensional images.

Example 12 may include elements of any of examples 1 through 8 where the machine-readable instructions that cause the proactive vehicle controller to acquire data indicative of at least one environmental event within a field-of-view of the at least one data acquisition device, may further cause the proactive vehicle controller to: acquire data indicative of at least one environmental event that includes at least one of: a wind event, an atmospheric electrical event, a liquid precipitation event, a freezing precipitation event, or a frozen precipitation event.

Example 13 may include elements of example 12 where the machine-readable instructions that cause the proactive vehicle controller to acquire data indicative of at least one environmental event that includes a wind event, may further cause the proactive vehicle controller to acquire data indicative of at least one environmental event that includes at least one of: a lateral wind event, an updraft wind event, or a downdraft wind event.

According to example 14, there is provided a proactive vehicle controller. The proactive vehicle controller may include a circuit and a storage device communicably coupled to the circuit, the storage device including a machine-readable instruction set. The machine-readable instruction set may, when executed by the circuit, cause the circuit to: acquire data indicative of at least one environmental event within a field-of-view of at least one communicably coupled data acquisition device; predict at least one prospective force exerted on a vehicle chassis by the at least one environmental event; and proactively alters at least one operating parameter of a vehicle to at least partially compensate for the at least one predicted prospective force exerted on the vehicle chassis.

Example 15 may include elements of example 14 where the machine-readable instructions that cause the circuit to acquire data indicative of at least one environmental event within a field-of-view of at least one communicably coupled data acquisition device, may further cause the circuit to acquire data indicative of at least one environmental event remote from the vehicle and within the field-of-view of the at least one data acquisition device.

Example 16 may include elements of example 15 where the machine-readable instructions that cause the circuit to acquire data indicative of at least one environmental event remote from the controller and within the field-of-view of the at least one data acquisition device, may further cause the circuit to acquire data indicative of at least one environmental event remote from the vehicle, within the field-of-view of the at least one data acquisition device, and along an intended route of the vehicle.

Example 17 may include elements of example 15 where the machine-readable instructions that cause the circuit to acquire data indicative of at least one environmental event remote from the vehicle chassis and within the field-of-view of the at least one data acquisition device, may further cause the circuit to acquire data representative of at least one object that appears within the field-of-view of the at least one data acquisition device.

Example 18 may include elements of example 16 where the machine-readable instructions that cause the circuit to acquire data representative of at least one object that appears within the field-of-view of the at least one data acquisition device, may further cause the circuit to identify at least one physical attribute logically associated with the at least one object that appears within the field-of-view of the at least one data acquisition device.

Example 19 may include elements of example 18 where the machine-readable instructions that cause the circuit to predict at least one prospective force exerted on a vehicle chassis by the at least one environmental event, may further cause the circuit to predict at least one prospective force exerted on the vehicle chassis based at least in part on a detected change in the at least one object over a defined temporal time period.

Example 20 may include elements of example 19 where the machine-readable instructions that cause the circuit to predict at least one prospective force exerted on the vehicle chassis based at least in part on a detected change in the at least one object over a defined temporal time period, further cause the circuit to predict at least one prospective force exerted on the vehicle chassis based at least in part on a detected change in the at least one object that includes at least one of: a change in a location of the at least one object; a change in a motion of the at one object; a change in an appearance of the at least one object; a change in a texture of the at least one object; or a change in a velocity of the at least one object.

Example 21 may include elements of any of examples 14 through 20 where the machine-readable instructions that cause the circuit to acquire data indicative of at least one environmental event within a field-of-view of at least one communicably coupled data acquisition device, may further cause the circuit to acquire image data indicative of at least one object within a field-of-view of at least one communicably coupled data acquisition device.

Example 22 may include elements of example 21 where the machine-readable instructions that cause the circuit to acquire image data indicative of at least one object within a field-of-view of at least one communicably coupled data acquisition device, further cause the circuit to acquire three-dimensional image data indicative of at least one object within a field-of-view of at least one communicably coupled data acquisition device.

Example 23 may include elements of example 21 where the machine-readable instructions that cause the circuit to acquire three-dimensional image data indicative of at least one environmental event within a field-of-view of at least one communicably coupled data acquisition device, may further cause the circuit to acquire data representative of a sequence of three-dimensional images that include image data indicative of at least one environmental event within a field-of-view of at least one communicably coupled data acquisition device.

Example 24 may include elements of any of examples 14 through 20 where the machine-readable instructions that cause the circuit to acquire data indicative of at least one environmental event within a field-of-view of at least one communicably coupled data acquisition device, may further cause the circuit to acquire data indicative of at least one environmental event that includes at least one of: a wind event, an atmospheric electrical event, a liquid precipitation event, a freezing precipitation event, or a frozen precipitation event.

Example 25 may include elements of example 24 where the machine-readable instructions that cause the circuit to acquire data indicative of at least one environmental event that includes a wind event, may further cause the circuit to acquire data indicative of at least one of either a wind direction or a wind velocity of an environmental event that includes at least one of: a lateral wind event, an updraft wind event, or a downdraft wind event.

According to example 26, there is provided a storage device that includes machine-readable instructions that, when executed by a circuit, may cause the circuit to provide a proactive vehicle controller, the proactive vehicle controller to: acquire data indicative of at least one environmental event within a field-of-view of at least one communicably coupled data acquisition device carried by a vehicle; predict at least one prospective force exerted on the vehicle by the at least one environmental event; and proactively alter at least one operating parameter of the vehicle to at least partially compensate for the predicted at least one prospective force.

Example 27 may include elements of example 26 where the machine-readable instructions that cause the proactive vehicle controller to acquire data indicative of at least one environmental event within a field-of-view of at least one communicably coupled data acquisition device, may further cause the proactive vehicle controller to acquire data indicative of at least one environmental event remote from the vehicle and within the field-of-view of the at least one data acquisition device.

Example 28 may include elements of example 27 where the machine-readable instructions that cause the proactive vehicle controller to acquire data indicative of at least one environmental event remote from the controller and within the field-of-view of the at least one data acquisition device, may further cause the proactive vehicle controller to acquire data indicative of at least one environmental event remote from the vehicle, within the field-of-view of the at least one data acquisition device, and along a direction of travel of the vehicle.

Example 29 may include elements of example 27 where the machine-readable instructions that cause the proactive vehicle controller to acquire data indicative of at least one environmental event remote from the vehicle chassis and within the field-of-view of the at least one data acquisition device, further cause the proactive vehicle controller to acquire data representative of at least one object that appears within the field-of-view of the at least one data acquisition device.

Example 30 may include elements of example 29 where the machine-readable instructions that cause the proactive vehicle controller to acquire data representative of at least one object that appears within the field-of-view of the at least one data acquisition device, may further cause the proactive vehicle controller to identify at least one physical aspect logically associated with the at least one object that appears within the field-of-view of the at least one data acquisition device.

Example 31 may include elements of example 30 where the machine-readable instructions that cause the proactive vehicle controller to predict at least one prospective force exerted on a vehicle by the at least one environmental event, may further cause the proactive vehicle controller to predict at least one prospective force exerted on the vehicle based at least in part on a detected change in the at least one object over a defined temporal time period.

Example 32 may include elements of example 31 where the machine-readable instructions that cause the proactive vehicle controller to predict at least one prospective force exerted on the vehicle based at least in part on a detected change in the at least one object over a defined temporal time period, may further cause the proactive vehicle controller to predict at least one prospective force exerted on the vehicle based at least in part on a detected change in the at least one object that includes at least one of: a change in a location of the at least one object; a change in a motion of the at one object; a change in an appearance of the at least one object; a change in a texture of the at least one object; or a change in a velocity of the at least one object.

Example 33 may include elements of any of examples 26 through 32 where the machine-readable instructions that cause the proactive vehicle controller to acquire data indicative of at least one environmental event within a field-of-view of at least one communicably coupled data acquisition device, may further cause the proactive vehicle controller to acquire image data indicative of at least one environmental event within a field-of-view of at least one communicably coupled data acquisition device.

Example 34 may include elements of example 33 where the machine-readable instructions that cause the proactive vehicle controller to acquire image data indicative of at least one environmental event within a field-of-view of at least one communicably coupled data acquisition device, may further cause the proactive vehicle controller to acquire three-dimensional image data indicative of at least one environmental event within a field-of-view of at least one communicably coupled data acquisition device.

Example 35 may include elements of example 34 where the machine-readable instructions that cause the proactive vehicle controller to acquire three-dimensional image data indicative of at least one environmental event within a field-of-view of at least one communicably coupled data acquisition device, may further cause the proactive vehicle controller to acquire data representative of a sequence of three-dimensional images that include image data indicative of at least one environmental event within a field-of-view of at least one communicably coupled data acquisition device.

Example 36 may include elements of any of examples 26 through 32 where the machine-readable instructions that cause the proactive vehicle controller to acquire data indicative of at least one environmental event within a field-of-view of at least one communicably coupled data acquisition device, further cause the proactive vehicle controller to acquire data indicative of at least one environmental event that includes at least one of: a wind event, an atmospheric electrical event, a liquid precipitation event, a freezing precipitation event, or a frozen precipitation event.

Example 37 may include elements of example 36 where the machine-readable instructions that cause the proactive vehicle controller to acquire data indicative of at least one environmental event that includes a wind event, further cause the proactive vehicle controller to acquire data indicative of at least one of either a wind direction or a wind velocity of an environmental event that includes at least one of: a lateral wind event, an updraft wind event, or a downdraft wind event.

According to example 38, there is provided a route guidance method. The method may include acquiring, by a proactive vehicle controller, data indicative of at least one environmental event within a field-of-view of at least one communicably coupled data acquisition device carried by a vehicle and communicably coupled to the route guidance controller. The method may further include predicting, by the proactive vehicle controller, at least one prospective force exerted on the vehicle by the at least one environmental event; and proactively altering, by the proactive vehicle controller, at least one operating parameter of the vehicle to at least partially compensate for the predicted at least one prospective force.

Example 39 may include elements of example 38 where acquiring data indicative of at least one environmental event within a field-of-view of at least one communicably coupled data acquisition device may include acquiring, by the proactive vehicle controller, data indicative of at least one environmental event remote from the vehicle and within the field-of-view of the at least one data acquisition device.

Example 40 may include elements of example 39 where acquiring data indicative of at least one environmental event remote from the controller and within the field-of-view of the at least one data acquisition device may include acquiring, by the proactive vehicle controller, data indicative of at least one environmental event remote from the vehicle, within the field-of-view of the at least one data acquisition device, and along an intended route of the vehicle.

Example 41 may include elements of example 39 where acquiring data indicative of at least one environmental event remote from the vehicle chassis and within the field-of-view of the at least one data acquisition device may include acquiring, by the proactive vehicle controller, data representative of at least one object that appears within the field-of-view of the at least one data acquisition device.

Example 42 may include elements of example 41 where acquiring data representative of at least one object that appears within the field-of-view of the at least one data acquisition device may include identifying, by the proactive vehicle controller, at least one physical aspect logically associated with the at least one object that appears within the field-of-view of the at least one data acquisition device.

Example 43 may include elements of example 42 where predicting at least one prospective force exerted on a vehicle by the at least one environmental event may include predicting, by the proactive vehicle controller, at least one prospective force exerted on the vehicle based at least in part on a detected change in the at least one object over a defined temporal time period.

Example 44 may include elements of example 43 where predicting at least one prospective force exerted on the vehicle based at least in part on a detected change in the at least one object over a defined temporal time period may include predicting, by the proactive vehicle controller, at least one prospective force exerted on the vehicle based at least in part on a detected change in the at least one object that includes at least one of: a change in a location of the at least one object; a change in a motion of the at one object; a change in an appearance of the at least one object; a change in a texture of the at least one object; or a change in a velocity of the at least one object.

Example 45 may include elements or any of examples 37 through 44 where acquiring data indicative of at least one environmental event within a field-of-view of at least one communicably coupled data acquisition device may include acquiring, by the proactive vehicle controller, image data indicative of at least one environmental event within a field-of-view of at least one communicably coupled data acquisition device.

Example 46 may include elements of example 45 where the machine-readable instructions that cause the proactive vehicle controller to acquire image data indicative of at least one environmental event within a field-of-view of at least one communicably coupled data acquisition device may include acquiring, by the proactive vehicle controller, three-dimensional image data indicative of at least one environmental event within a field-of-view of at least one communicably coupled data acquisition device.

Example 47 may include elements of example 46 where acquiring three-dimensional image data indicative of at least one environmental event within a field-of-view of at least one communicably coupled data acquisition device may include acquiring, by the route guidance controller, data representative of a sequence of three-dimensional images that include image data indicative of at least one environmental event within a field-of-view of at least one communicably coupled data acquisition device.

Example 48 may include elements of any of examples 37 through 44 where acquiring data indicative of at least one environmental event within a field-of-view of at least one communicably coupled data acquisition device may include acquiring, by the proactive vehicle controller, data indicative of at least one environmental event that includes at least one of: a wind event, an atmospheric electrical event, a liquid precipitation event, a freezing precipitation event, or a frozen precipitation event.

Example 49 may include elements of example 48 where acquiring data indicative of at least one environmental event that includes a wind event may include acquiring, by the proactive vehicle controller, data indicative of at least one of either a wind direction or a wind velocity of an environmental event that includes at least one of: a lateral wind event, an updraft wind event, or a downdraft wind event.

According to example 50, there is provided a proactive vehicle control system that includes a means for acquiring data indicative of at least one environmental event external to a vehicle. The system may further include a means for predicting at least one prospective force exerted on a chassis of the vehicle by the at least one environmental event and a means for proactively altering at least one operating parameter of the vehicle to at least partially compensate for the predicted at least one prospective force.

Example 51 may include elements of example 50 where the means for acquiring data indicative of at least one environmental event external to a vehicle may include a means for acquiring data indicative of at least one environmental event external to the vehicle and along a direction of travel of the vehicle.

Example 52 may include elements of example 51 where the means for acquiring data indicative of at least one environmental event external to the vehicle may include a means for acquiring data representative of at least one object that appears within the field-of-view of the at least one data acquisition device.

Example 53 may include elements of example 52 where the means for acquiring data representative of at least one object that appears within the field-of-view of the at least one data acquisition device may include a means for identifying at least one physical aspect logically associated with the at least one object.

Example 54 may include elements of example 53 where the means for predicting the at least one prospective force exerted on a chassis of the vehicle by the at least one environmental event may include a means for predicting at least one prospective force exerted on the chassis of the vehicle based at least in part on a detected change in the at least one object over a defined temporal time period.

Example 55 may include elements of example 54 where the means for predicting at least one prospective force exerted on the chassis of the vehicle based at least in part on a detected change in the at least one object over a defined temporal time period may include a means for predicting at least one prospective force exerted on the chassis of the vehicle based at least in part on a detected change in the at least one object that includes at least one of: a change in a location of the at least one object; a change in a motion of the at one object; a change in an appearance of the at least one object; a change in a texture of the at least one object; or a change in a velocity of the at least one object.

Example 56 may include elements of any of examples 50 through 55 where the means for acquiring data indicative of at least one environmental event external to a vehicle may include a means for acquiring image data indicative of the at least one environmental event.

Example 57 may include elements of example 56 where the means for acquiring image data indicative of at least one environmental event may include a means for acquiring three-dimensional image data indicative of at least one environmental event.

Example 58 may include elements of example 57 where the means for acquiring three-dimensional image data indicative of at least one environmental event may include a means for acquiring data representative of a sequence of three-dimensional images that include image data indicative of at least one environmental event.

Example 59 may include elements of any of examples 50 through 55 where the means for acquiring data indicative of at least one environmental event external to a vehicle may include a means for acquiring data indicative of at least one environmental event that includes at least one of: a wind event, an atmospheric electrical event, a liquid precipitation event, a freezing precipitation event, or a frozen precipitation event.

Example 60 may include elements of example 59 where the means for acquiring data indicative of at least one environmental event that includes a wind event may include a means for acquiring data indicative of at least one of either a wind direction or a wind velocity of an environmental event that includes at least one of: a lateral wind event, an updraft wind event, or a downdraft wind event.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:
1. A proactive vehicle control system for unmanned vehicles, comprising:
   a vehicle that includes a vehicle chassis;
   at least one data acquisition camera operably coupled to the vehicle chassis to detect a movement of an object indicative of an environmental event within a field-of-view of the at least one data acquisition camera;

a circuit communicably coupled to the at least one data acquisition camera; and a storage device communicably coupled to the circuit, the storage device including a machine-readable instruction set that, when executed by the circuit, causes the circuit to provide a proactive vehicle controller to:

acquire image data, speed data, and direction data of the object;

identify the object based on the image data;

acquire, based on the identification of the object, one or more physical attributes of the object from a data store retained in the storage device;

predict at least one prospective force exerted on the vehicle chassis by the environmental event based on the speed data, the direction data, and the one or more physical attributes of the object; and alter at least one operating parameter of the vehicle to at least partially compensate for the at least one predicted prospective force exerted on the vehicle chassis.

2. The proactive vehicle control system of claim 1 wherein the machine-readable instructions that cause the proactive vehicle controller to predict at least one prospective force exerted on the vehicle chassis by the environmental event, further cause the proactive vehicle controller to:

predict at least one prospective force exerted on the vehicle chassis by the environmental event remote from the vehicle and along an intended direction of travel of the vehicle.

3. The proactive vehicle control system of claim 1 wherein the machine-readable instructions further cause the proactive vehicle controller to:

acquire data indicative of at least one of: a weather-related event or an environmental-related event; and communicate the acquired data to one or more locations remote from the vehicle on a real-time or a near real-time basis.

4. The proactive vehicle control system of claim 1 wherein the machine-readable instructions further comprising:

predict the at least one prospective force on the vehicle chassis based at least in part on a detected change in the at least one object that includes at least one of: a change in a location of the at least one object; a change in a motion of the at one object; a change in an appearance of the at least one object; a change in a texture of the at least one object; or a change in a velocity of the at least one object.

5. The proactive vehicle control system of claim 1 wherein the at least one data acquisition camera comprises a three-dimensional image acquisition camera.

6. The proactive vehicle control system of claim 1 wherein the at least one environmental event includes at least one of: a wind event, an atmospheric electrical event, a liquid precipitation event, a freezing precipitation event, or a frozen precipitation event.

7. The proactive vehicle control system of claim 6 wherein the wind event includes at least one of: a lateral wind event, an updraft wind event, or a downdraft wind event.

8. A proactive vehicle control method, comprising:

detecting, by at least one data acquisition camera, a movement of an object indicative of at least one environmental event within a field-of-view of the at least one data acquisition camera carried by a vehicle and communicably coupled to a proactive vehicle controller;

acquiring, by the proactive vehicle controller, image data, speed data, and direction data of the object;

identifying, by the proactive vehicle controller, the object based on the image data;

acquiring, by the proactive controller, based on the identification of the object, one or more physical attributes of the object from a data store retained in a storage device;

predicting, by the proactive vehicle controller, at least one prospective force exerted on the vehicle by the at least one environmental event based on the speed data, the direction data, and the one or more physical attributes of the object; and altering, by the proactive vehicle controller, at least one operating parameter of the vehicle to at least partially compensate for the predicted at least one prospective force.

9. The method of claim 8 wherein detecting a movement of an object indicative of an environmental event within a field-of-view of the at least one data acquisition camera comprises:

detecting, by at least one data acquisition camera, movement of an object indicative of at least one environmental event remote from the vehicle and within the field-of-view of the at least one data acquisition camera.

10. The method of claim 9 wherein detecting a movement of an object indicative of an environmental event within a field-of-view of the at least one data acquisition camera comprises:

detecting, by at least one data acquisition camera, movement of an object indicative of at least one environmental event remote from the vehicle, within the field-of-view of the at least one data acquisition device, and along an intended route of the vehicle.

11. The method of claim 8 wherein predicting at least one prospective force exerted on a vehicle by the at least one environmental event comprises:

predicting, by the proactive vehicle controller, at least one prospective force exerted on the vehicle based at least in part on a detected change in the object over a defined temporal time period.

12. The method of claim 11 wherein predicting at least one prospective force exerted on the vehicle based at least in part on a detected change in the at least one object over a defined temporal time period comprises:

predicting, by the proactive vehicle controller, at least one prospective force exerted on the vehicle based at least in part on a detected change in the object that includes at least one of: a change in a location of the at least one object; a change in a motion of the object; a change in an appearance of the object; a change in a texture of the object; or a change in a velocity of the object.

13. The method of claim 8 wherein acquiring, by the proactive vehicle controller image data, speed data, and direction data of the object further comprises:

acquiring, by the proactive vehicle controller, three-dimensional image data indicative of at least one environmental event within a field-of-view of at least one communicably coupled data acquisition camera.

14. The method of claim 13 wherein acquiring three-dimensional image data indicative of at least one environmental event within a field-of-view of at least one communicably coupled data acquisition camera comprises:

acquiring, by the proactive vehicle controller, data representative of a sequence of three-dimensional images that include image data indicative of at least one environmental event within a field-of-view of at least one communicably coupled data acquisition camera.

15. The method of claim 8 wherein data indicative of at least one environmental event that includes at least one of: a wind event, an atmospheric electrical event, a liquid precipitation event, a freezing precipitation event, or a frozen precipitation event.

16. The method of claim 15 wherein data indicative of at least one of either a wind direction or a wind velocity of an environmental event that includes at least one of: a lateral wind event, an updraft wind event, or a downdraft wind event.

17. A storage device that includes machine-readable instructions that, when executed by a circuit, cause the circuit to provide a proactive vehicle controller, the proactive vehicle controller to:

acquire image data, speed data, and direction data of an object;

wherein a movement of the object indicative of at least one environmental event is detected within a field-of-view of at least one data acquisition camera carried by a vehicle and communicably coupled to the proactive vehicle controller;

identify the object based on the image data;

acquire, based on the identification of the object, one or more physical attributes of the object from a data store retained in the storage device;

predict at least one prospective force exerted on the vehicle by the at least one environmental event based on the speed data, the direction data, and the one or more physical attributes of the object; and alter at least one operating parameter of the vehicle to at least partially compensate for the predicted at least one prospective force.

18. The storage device of claim 17 wherein the at least one environmental event is remote from the vehicle and within the field-of-view of the at least one data acquisition camera.

* * * * *